United States Patent
Shull

(10) Patent No.: US 11,371,219 B2
(45) Date of Patent: Jun. 28, 2022

(54) SHOVEL-TO-TRUCK COMMUNICATION TO IMPROVE ACCELERATION

(71) Applicant: Caterpillar Inc., Deerfield, IL (US)

(72) Inventor: Brandon Shull, Sahuarita, AZ (US)

(73) Assignee: Caterpillar Inc., Peoria, IL (US)

( * ) Notice: Subject to any disclaimer, the term of this patent is extended or adjusted under 35 U.S.C. 154(b) by 525 days.

(21) Appl. No.: 16/245,877

(22) Filed: Jan. 11, 2019

(65) Prior Publication Data
US 2020/0224392 A1  Jul. 16, 2020

(51) Int. Cl.
| E02F 9/26 | (2006.01) |
| E02F 9/20 | (2006.01) |
| G05D 1/00 | (2006.01) |
| G01G 19/08 | (2006.01) |

(52) U.S. Cl.
CPC ............ *E02F 9/265* (2013.01); *E02F 9/2041* (2013.01); *E02F 9/2045* (2013.01); *G01G 19/08* (2013.01); *G05D 1/0011* (2013.01)

(58) Field of Classification Search
None
See application file for complete search history.

(56) References Cited

U.S. PATENT DOCUMENTS

| 6,044,312 A * | 3/2000 | Sudo ........................ E02F 3/842 340/988 |
| 6,211,471 B1 | 4/2001 | Rocke et al. |
| 2007/0135985 A1 * | 6/2007 | Berry .................... E02F 9/2029 701/50 |
| 2012/0130599 A1 * | 5/2012 | Faivre .................... E02F 9/2033 701/50 |
| 2012/0290178 A1 | 11/2012 | Suzuki et al. |
| 2014/0214236 A1 * | 7/2014 | Kini ........................ E02F 9/205 701/2 |
| 2015/0376869 A1 | 12/2015 | Jackson |
| 2016/0223387 A1 * | 8/2016 | Talmaki ............... G01G 19/083 |
| 2018/0087240 A1 * | 3/2018 | Schmitt .................... E02F 3/437 |
| 2019/0023271 A1 * | 1/2019 | Young ................... F02D 41/021 |

FOREIGN PATENT DOCUMENTS

| JP | 2008240461 A | 3/2007 |
| WO | WO-2015151359 A1 * | 10/2015 ............ E02F 9/2045 |

OTHER PUBLICATIONS

"Yukihiro, Vehicle travel control system and control server, 2015" (Year: 2015).*

* cited by examiner

*Primary Examiner* — Geepy Pe
*Assistant Examiner* — Bakari Underwood
(74) *Attorney, Agent, or Firm* — Harrity & Harrity LLP

(57) ABSTRACT

A system may determine that an upcoming pass is a final pass associated with loading a machine. The system may compute, based on determining that the upcoming pass is the final pass, a trigger time associated with causing a trigger signal to be transmitted. The trigger time may be computed based on a final pass completion time that identifies a time at which the final pass is expected to be completed. The trigger time may be prior to the final pass completion time. The system may cause the trigger signal to be transmitted at the trigger time. The system may cause, based on a receipt of the trigger signal, a transition of the machine from an idle state to a ready state to be initiated. The transition from the idle state to the ready state may be caused to be initiated prior to a time at which the final pass, associated with loading the machine, is completed.

20 Claims, 7 Drawing Sheets

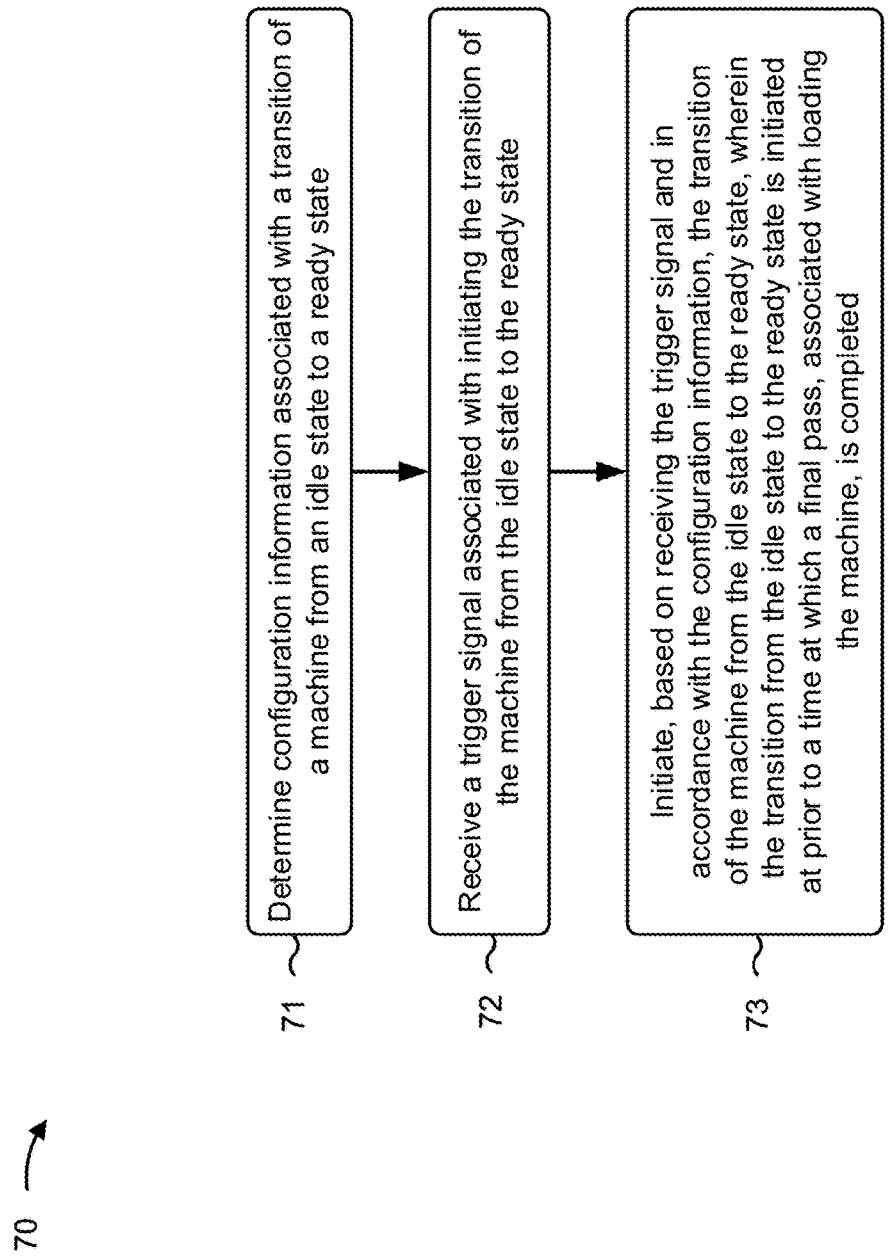

SHOVEL-TO-TRUCK COMMUNICATION TO IMPROVE ACCELERATION

TECHNICAL FIELD

The present disclosure relates generally systems for communication and control between a loading machine (e.g., a shovel) and a hauling machine (e.g., a mining truck) and, more particularly, to systems that improve operation of the hauling machine as related to moving away from a load location after loading by the loading machine.

BACKGROUND

A loading machine (e.g., a shovel, an excavator, a wheel loader, and/or the like) may load a hauling machine (e.g., a mining truck, a haul truck, a dump truck, and/or the like) while the hauling machine is positioned at a load location (e.g., a location at which a bucket of the loading machine can dump material into the hauling machine). The loading machine may perform one or more passes in order to load the hauling machine. In other words, the loading machine may repeatedly acquire and dump material into the hauling machine until a time at which the hauling machine is fully loaded. Once the hauling machine is fully loaded, the hauling machine needs to clear the load location (e.g., accelerate away from the load location). Once the fully loaded hauling machine has cleared the load location, another hauling machine can move into position at the load location in order to be loaded by the loading machine. In order to improve efficiency of the operation, it is desirable to minimize an amount of time needed for the fully loaded hauling machine to clear the load location and get the other hauling machine to get into position at the load location.

In a conventional operation, the hauling machine detects (e.g., using a weight sensor) or is notified (e.g., by the loading machine or by an operator of the loading machine) when the hauling machine is fully loaded, after which the hauling machine begins a transition from an idle state (e.g., an engine idle state) to a ready state (e.g., a state at which the hauling machine has provided power to wheels of the hauling machine) in order to allow the hauling machine to clear the load location. However, since the hauling machine waits to initiate the transition from the idle state to the ready state until determining that the hauling machine is fully loaded, an amount of time needed for the fully loaded hauling machine to clear the load location and get another hauling machine in position in the load location could be improved.

Since productivity of a given operation is dependent on up-time of the loading machine (e.g., productivity increases as up-time of the loading machine increases, and productivity decreases as up-time of the loading machine decreases), a delay between clearing a first hauling machine from the load location and moving a second hauling machine into position in the load location should be minimized. The delay between the time at which a given hauling machine is fully loaded and a time at which the given hauling machine has full engine power to the ground or is capable of moving is a significant contributor to this delay.

The systems and methods of the present disclosure solve one or more of the problems set forth above and/or other problems in the relevant art.

SUMMARY

According to some implementations, a system may comprise one or more devices to: determine that an upcoming pass is a final pass associated with loading a machine; compute, based on determining that the upcoming pass is the final pass, a trigger time at which to transmit a trigger signal, wherein the trigger time is computed based on a final pass completion time that identifies a time at which the final pass is expected to be completed, and wherein the trigger time is prior to the final pass completion time; and transmit the trigger signal at the trigger time in order to cause the machine to initiate a transition from an idle state to a ready state before the final pass is completed.

According to some implementations, a system may comprise one or more devices to: determine configuration information associated with a transition of a machine from an idle state to a ready state; receive a trigger signal associated with initiating the transition of the machine from the idle state to the ready state; and initiate, based on receiving the trigger signal and in accordance with the configuration information, the transition of the machine from the idle state to the ready state, wherein the transition from the idle state to the ready state is initiated at prior to a time at which a final pass, associated with loading the machine, is completed.

According to some implementations, a method may comprise: determining, by a system, that an upcoming pass is a final pass associated with loading a machine; computing, by the system and based on determining that the upcoming pass is the final pass, a trigger time associated with causing a trigger signal to be transmitted, wherein the trigger time is computed based on a final pass completion time that identifies a time at which the final pass is expected to be completed, and wherein the trigger time is prior to the final pass completion time; causing, by the system, the trigger signal to be transmitted at the trigger time; and causing, by the system and based on a receipt of the trigger signal, a transition of the machine from an idle state to a ready state to be initiated, wherein the transition from the idle state to the ready state is caused to be initiated prior to a time at which the final pass, associated with loading the machine, is completed.

BRIEF DESCRIPTION OF THE DRAWINGS

FIG. 7 is a flow chart of an example process for initiating, based on receiving a trigger signal, a transition from an idle state to a ready state before a final pass, associated with loading a hauling machine, is completed.

DETAILED DESCRIPTION

Some implementations described herein relate to various machines, such as a shovel, an excavator, a backhoe loader, a wheel loader, an industrial loader, a knuckleboom loader, a material handler, a mining truck, a haul truck, a flatbed truck, a pickup truck, a hydraulic mining shovel, a dragline excavator, an electric rope shovel, or another type of machine that performs a loading operation or a hauling operation associated with an industry such as, for example, mining, construction, farming, transportation, or any other industry. One or more of the machines described herein can be unmanned machines (e.g., autonomous machines) or manned machines (e.g., controlled by an operator).

Figure 1:
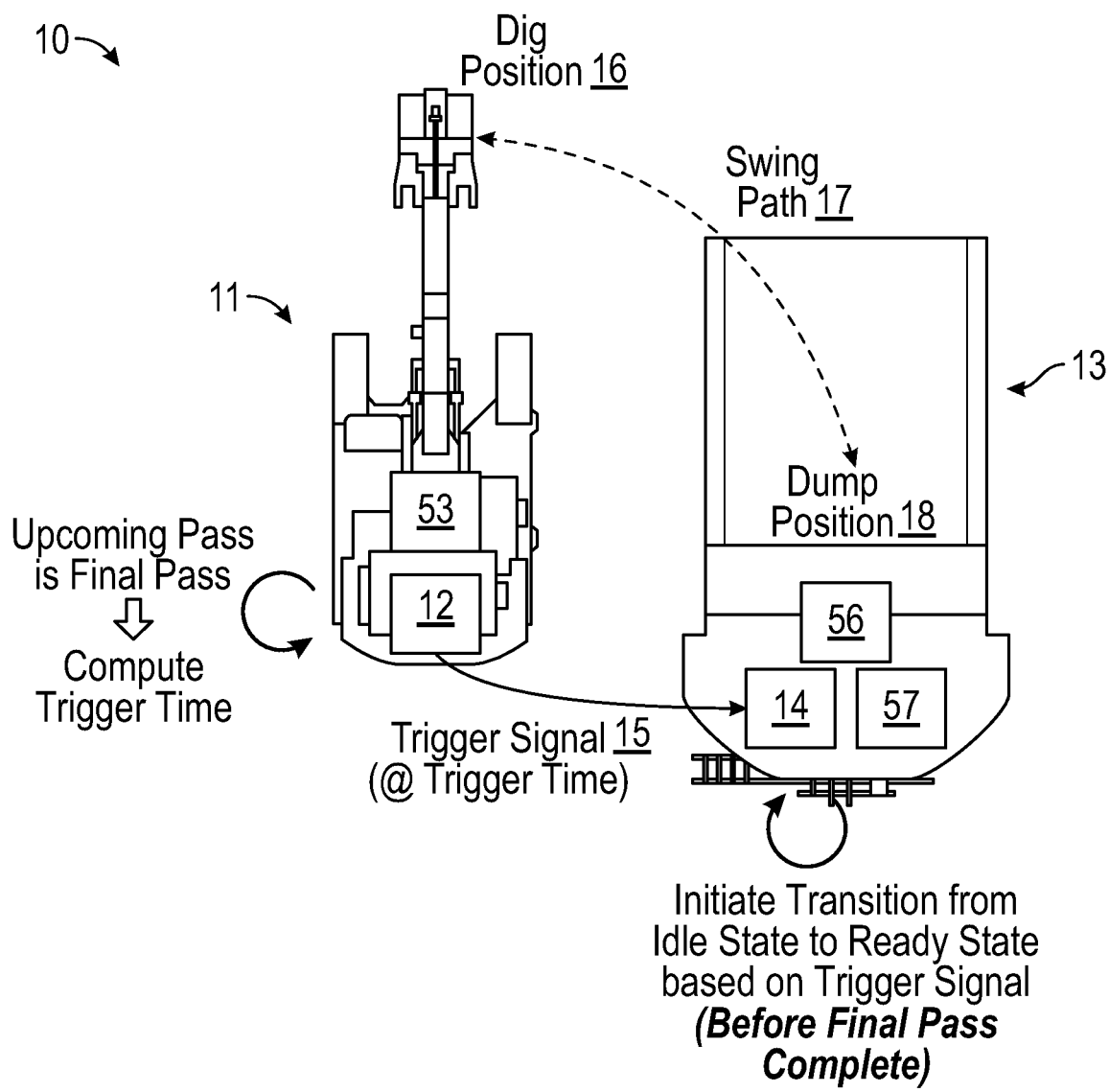
FIGS. 1-4 are diagrams associated with one or more example implementations described herein.
Figure 2:
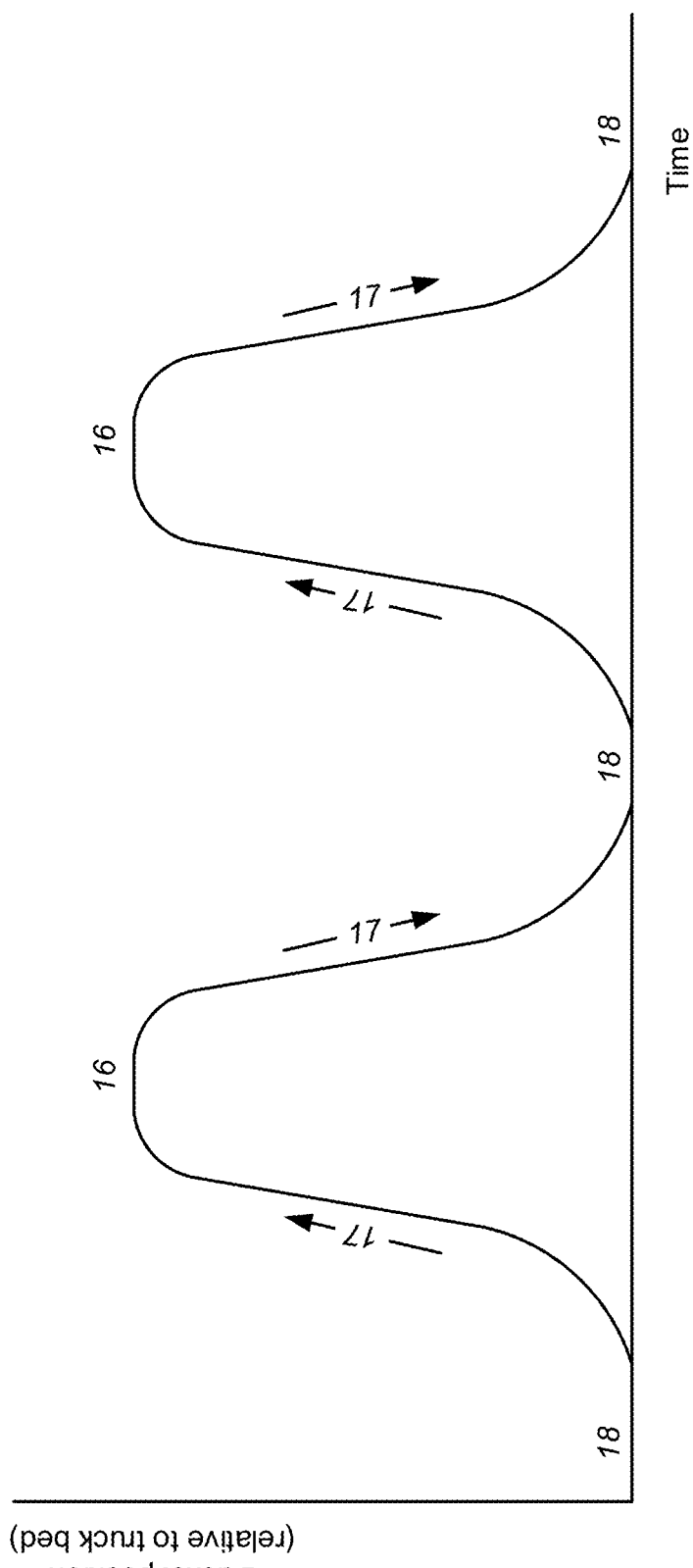

FIGS. 1-4 are diagrams associated with one or more example implementations 10 described herein. As shown in FIG. 1, a loading machine 11 is configured with a trigger system 12 (e.g., which may be included in an engine control module (ECM) of loading machine 11). As shown, the loading machine 11 is loading a hauling machine 13 that is configured with a transition system 14 (e.g., which may be included in an engine control module (ECM) of hauling machine 13). During loading of hauling machine 13, loading machine 11 makes one or more passes. For example, as indicated in FIG. 1, a given pass may include loading machine 11 acquiring material while a bucket of loading machine 11 is at a dig position 16, swinging the bucket (e.g., along an angular swing path 17) to a dump position 18 over a bed of hauling machine 13, and dumping the material from the bucket in the bed of hauling machine 13. Loading machine 11 can then swing the bucket back along the swing path 17 to the dig position 16, and the above process can be repeated until such time that hauling machine 13 is fully loaded (e.g., after a final pass). FIG. 2 is a provided to illustrate the loading process based on a position of the bucket of loading machine 11 relative to the bed of hauling machine 13 over multiple passes. As indicated in FIG. 2, each pass associated with loading hauling machine 13 may be executed similarly.

During the loading process, trigger system 12 may determine that an upcoming pass (e.g., a next pass to be executed, a pass that has yet to be completed, an anticipated pass, and/or the like) is a final pass (e.g., a pass after which hauling machine 13 will be fully loaded to payload capacity). Trigger system 12 may determine that the upcoming pass is the final pass based on current load information associated with hauling machine 13. The current load information includes information that identifies a current load (e.g., a weight of material, a volume of material, a number of loaded units, and/or the like) that is currently loaded in hauling machine 13. Trigger system 12 may determine the current load information based on receiving the current load information from hauling machine 13 (e.g., when transition system 14 is configured to transmit the current load information to trigger system 12 after each pass, on a periodic basis, and/or the like). In such a case, trigger system 12 may determine the current load information immediately after a most recent pass (e.g., when transition system 14 is configured to transmit the current load information immediately after each pass via communication module).

Additionally, or alternatively, trigger system 12 may determine the current load information based on computing the current load information during the loading of hauling machine 13. For example, trigger system 12 may determine the current load information when trigger system 12 tracks a load deposited during each pass such that trigger system 12 maintains a running total of the amount of material loaded into hauling machine 13 (e.g., based on sensing a weight of each load provided to the hauling machine during each pass). In such a case, trigger system 12 may determine the current load information during a most recent pass (e.g., before a most recent material dump into hauling machine 13, while loading machine 11 is swinging the bucket to the dump position, and/or the like).

Trigger system 12 may determine that the upcoming pass is the final pass based on the current load information, information that identifies a full load of hauling machine 13, and information that identifies a load that is expected to be loaded in hauling machine 13 in the upcoming pass. For example, trigger system 12 may store (e.g., in a local data structure) or have access to (e.g., from a remote data structure) information that identifies the amount of material that represents a full load (e.g., trigger system 12 may store full load information associated with one or more types of hauling machines 13). Here, trigger system 12 may predict the amount of material that is expected to be loaded in the upcoming pass (e.g., based on an average or weighted average of material loaded during one or more previous passes, based on information that identifies a typical amount of material in a given pass, and/or the like). Next, trigger system 12 may determine whether the amount of material that is expected to be loaded in the upcoming pass, when added to the current load of hauling machine 13, will result in hauling machine 13 being fully loaded (e.g., such that hauling machine 13 will be loaded with an amount of material that matches, within a threshold amount, the identified full load of hauling machine 13). Here, if trigger system 12 determines that the amount of material expected to be loaded in the upcoming pass will cause hauling machine 13 to be fully loaded, then trigger system 12 may determine that the upcoming pass is the final pass. Conversely, if trigger system 12 determines that the amount of material expected to be loaded in the upcoming pass will not cause hauling machine 13 to be fully loaded, then trigger system 12 may determine that the upcoming pass is not the final pass.

Trigger system 12 may determine whether the upcoming pass is the final pass during the upcoming pass (e.g., before the pass that is currently being performed is completed, such as while loading machine 11 is acquiring material at the dig position during the pass). Additionally, or alternatively, trigger system 12 may determine whether the upcoming pass is the final pass during another pass. For example, trigger system 12 may determine, during a first pass, whether a third pass will be the final pass, whether a fourth pass will be the final pass, and so on.

As further shown in FIG. 1, when trigger system 12 determines that the upcoming pass is the final pass, trigger system 12 may compute a trigger time. The trigger time is a time at which trigger system 12 is to transmit a trigger signal 15, and is a time that is prior to a time at which the final pass, associated with loading hauling machine 13, is completed. Trigger signal 15 is a signal transmitted in order to cause hauling machine 13 to begin a transition from an idle state to a ready state, as described in further detail below.

Trigger system 12 may compute the trigger time based on a final pass completion time, where the final pass completion time identifies a time at which the final pass is expected to be completed. Trigger system 12 may determine the final pass completion time based on a position of the bucket of loading machine 11 and/or a movement speed of the bucket of loading machine 11. For example, trigger system 12 may determine (e.g., based on information gathered during one or more previous passes, based on information detected by one or more sensors 53 of loading machine 11, and/or the like) that a rotation of approximately 90 degrees is needed to swing the bucket from the dig position to the dump position. Here, the trigger system 12 may also determine (e.g., based on information gathered during one or more previous passes, based on information detected by one or more sensors 53 of loading machine 11, based on machine specification information stored by trigger system 12, and/or the like) information that identifies an angular acceleration and/or angular speed that can be achieved during the swing from the dig position to the dump position. Thus, trigger system 12 may determine an amount of time needed to swing the bucket from the dig position to the dump position.

Trigger system 12 may also predict (e.g., based on information gathered in a data structure during one or more previous passes) an amount of time (e.g., an average or weighted average amount of time) to be taken to acquire material at the dig position, and an amount of time to be taken to dump the material at the dump position. Using this information, trigger system 12 may determine the final pass completion time from a given point during the loading process. For example, by adding the amount of time to be taken to acquire the material at the dig position, the amount of time to be taken to swing the bucket to the dump position, and the amount of time to be taken to dump the material, trigger system 12 may determine the final pass completion time relative to a point in time at which the bucket has returned to the dig position for the final pass.

Trigger system 12 may update and/or add to the data structure with information that identifies pass cycle times, information that identifies a number of pass cycles for a given hauling machine 13, information that identifies a payload capacity for a given hauling machine 13, information that identifies a total time to load a given hauling machine 13, and/or the like.

Additionally, or alternatively, trigger system 12 may determine the final pass completion time based on a set of pass completion times, each identifying a time at which a respective previous pass, associated with loading hauling machine 13, was completed. For example, trigger system 12 may determine an expected (e.g., average or weighted average) pass cycle time (e.g., an amount of time between completion of a given pair of passes) based on the set of pass completion times. Here, based on the expected pass cycle time, trigger system 12 may determine the final pass completion time relative to, for example, a point in time at which the most recent pass was completed.

Trigger system 12 may compute the trigger time based on a lead time. The lead time is an amount of time before the final pass completion time that trigger system 12 is to transmit trigger signal 15. Trigger system 12 may determine the lead time based on the lead time being configured or selected by an operator of loading machine 11 (e.g., via an operator interface of loading machine 11). Additionally, or alternatively, trigger system 12 may determine the lead time based on a configuration stored on trigger system 12. For example, trigger system 12 may be configured with a default lead time. As another example, trigger system 12 may be configured to select a lead time from a predetermined set of possible lead times, where the selection may depend on a type of hauling machine 13 and/or a type of loading machine 11. For example, trigger system 12 may store information indicating that a first lead time (e.g., 10 seconds) is to be used for a first type of hauling machine 13, and may store information indicating that second lead time (e.g., 13 seconds) is to be used for a second type of hauling machine. As other examples, the selection may depend on a length of a swing path between the dig position and the dump position, a distance between the dig position and the dump position, an amount of time needed to swing from the dig position to the dump position, and/or the like.

Trigger system 12 may compute the trigger time based on information provided by a group of sensors 53 including a location sensor associated with loading machine 11 (e.g., a GPS sensor affixed to the bucket of loading machine 11) and a location sensor associated with hauling machine 13 (e.g., a GPS sensor affixed to hauling machine 13). In such a case, trigger system 12 may use information provided by the location sensors in order to calculate a distance from the bucket of loading machine 11 to the bed of hauling machine. Here, the trigger time could be set based on, for example, a calibratable parameter for distance. As another example, the trigger time could be computed based on the distance and an angular velocity (e.g., the distance and the angular velocity could be used to calculate a time needed to reach the bed of the truck, and triggering could be performed based on this time).

Trigger system 12 may compute the trigger time based on subtracting the lead time from the final pass completion time. For example, assume that trigger system 12 determines that the final pass completion time is 30 seconds (s) from a time at which the bucket returns to the dig position for the final pass, and that trigger system 12 is configured with a 12 s lead time. Here, trigger system 12 may identify the trigger time as 18 s from the time at which the bucket returns to the dig position for the final pass (e.g., 30 s–12 s=18 s).

As further shown in FIG. 1, trigger system 12 may transmit trigger signal 15 at the trigger time. Trigger system 12 transmits trigger signal 15 in order to cause hauling machine 13 to initiate a transition from an idle state to a ready state before the final pass, associated with loading of hauling machine 13, is completed. For example, trigger system 12 may transmit trigger signal 15 while loading machine 11 is acquiring material for the final pass, or may transmit trigger signal 15 while the bucket is swinging from the dig position to the dump position.

As further shown in FIG. 1, transition system 14 may receive trigger signal 15, and may initiate the transition from the idle state to the ready state based on receiving trigger signal 15. Transition system 14 may initiate the transition of hauling machine 13 from the idle state to the ready state in accordance with configuration information associated with transitioning from the idle state to the ready state.

The configuration information includes information that describes a manner in which hauling machine 13 is to transition from the idle state to the ready state. For example, the configuration information may indicate that, when initiating the transition from the idle state to the ready state, a speed (e.g., rotations per minute (RPM)) of an engine of hauling machine 13 (e.g., included in an engine system 57) is to be increased (e.g., from an idle RPM to a comparatively higher RPM associated with the ready state). As another example, the configuration information may indicate that, when initiating the transition from the idle state to the ready state, the speed of the engine of hauling machine 13 is to be increased and that a pre-load is to be applied to the engine of hauling machine 13 (e.g., that a load is to be applied to the engine before hauling machine 13 is to move). As another example, the configuration information may indicate that, when initiating the transition from the idle state to the steady state, an engine calibration is to be changed (e.g., in a manner that improves acceleration of the engine of hauling machine 13). The engine calibration change can include, for example, adjustment of a variable geometry air system (e.g., adjusting an exhaust gas recirculation (EGR) valve, adjusting variable geometry turbo vanes, adjusting an electronically controlled boost control valve), adjustment of fuel injection pressure and/or the start of fuel injection timing, and/or the like.

The configuration information may be default configuration information, or may be configured based on input from a system operator.

As further shown in FIG. 1, based on receiving the trigger signal and in accordance with the configuration information, transition system 14 may initiate the transition of hauling machine 13 from the idle state to the ready state. As an example, when the configuration information indicates that the engine speed of hauling machine 13 is to be increased (e.g., to a particular RPM), transition system 14 may cause an engine speed of the engine of hauling machine 13 to increase.

Figure 3:
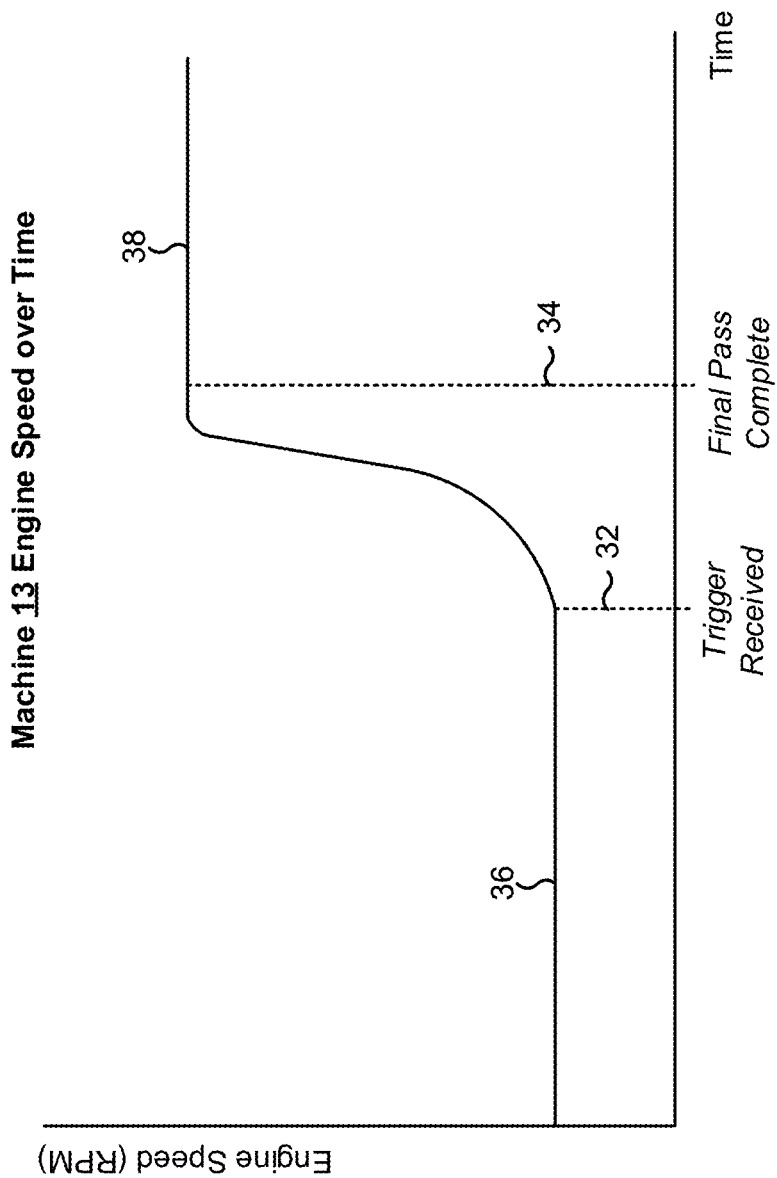

FIG. 3 is a diagram illustrating engine speed of the engine of hauling machine 13 over a time period near the final pass associated with loading hauling machine 13. As shown in FIG. 3, at the time at which the trigger signal is received (identified by reference number 32 in FIG. 3), transition system 14 may cause the engine speed to increase such that, by a time at which the final pass is completed (identified by reference number 34 in FIG. 3), the engine speed has increased from an idle speed 36 to a ready speed 38 (e.g., a particular RPM that facilitates movement of hauling machine 13).

As another example, when the configuration information indicates that the engine speed of hauling machine 13 is to be increased and that a pre-load is to be applied to the engine, transition system 14 may cause an engine speed of hauling machine 13 to be increased (e.g., as illustrated in FIG. 3) and may cause a pre-load to be applied to the engine.

Figure 4:
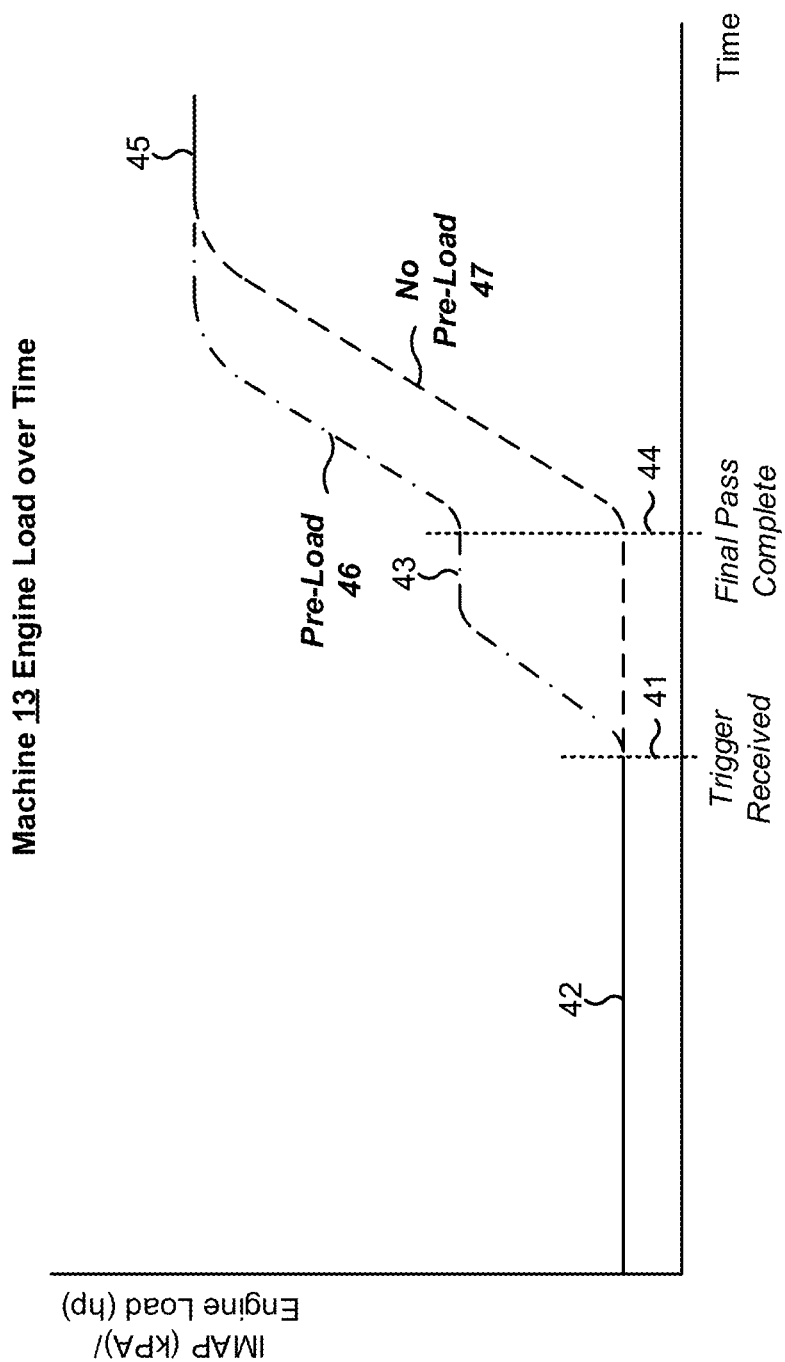

FIG. 4 is a diagram illustrating a load on the engine of hauling machine 13 over a time period near a final pass associated with loading hauling machine 13. As shown by pre-load line 46 (the dashed and dotted line) in FIG. 4, when a pre-load is applied, transition system 14 may cause the pre-load to be applied to the engine at the time at which the trigger signal is received (identified as reference number 41 in FIG. 4). In other words, the amount of load applied to the engine may increase from idle load 42 to pre-load 43 before the final pass is complete. Here, after the final pass is complete (as identified by reference number 44 in FIG. 4), additional load may be applied in order to bring the load on the engine to ready load 45. Conversely, as shown by no pre-load line 47 (the dashed line) in FIG. 4, when no pre-load is to be applied, transition system 14 may not cause pre-load to be applied to the engine at the time at which the trigger signal is received. Rather, a load may be applied to the engine at a time when the final pass is complete (e.g., such that the load on the engine goes from idle load 42 to ready load 45). Here, and as illustrated in FIG. 4, applying the pre-load based on the trigger signal allows the engine to have sufficient power comparatively faster than when a pre-load is not applied. As such, hauling machine 13 may have full engine power to the ground and/or be capable of clearing the load location sooner in the case of applying a pre-load to the engine (with a trade-off in fuel consumption of hauling machine 13). When a pre-load is applied to the engine of hauling machine 13, engine power that results from the pre-load being applied before the final pass is completed may be rejected over a retarding grid of hauling machine 13.

Notably, in either case (e.g., when only engine speed is increased, or when engine speed is increased and a pre-load is applied) the transition from the idle state to the ready state is initiated prior to a time at which the final pass is completed. As such, when the final pass is completed, the delay between the time at which hauling machine 13 is fully loaded and a time at which hauling machine 13 has full engine power to the ground and/or is capable of moving is reduced or eliminated, thereby allowing hauling machine 13 to clear the load location comparatively faster and, therefore, increasing productivity of the operation.

Trigger system 12 may determine that the final pass is completed (e.g., based on sensors 53 indicating that the bucket of loading machine 11 is empty, indicating that the bucket is moving toward the dig position, based on determining that the bucket has performed motions to empty, and/or the like), and may adjust the lead time. For example, trigger system 12 may identify (e.g., based on information provided by transition system 14) a time difference between the final pass completion time and a time at which a transition from the idle state to the ready state is completed. Here, trigger system 12 may selectively adjust (e.g., increase or reduce) the lead time based on the time difference (e.g., in order to increase or reduce an amount of time between a next final pass completion time, associated with loading a next hauling machine 13, and a transition of the next hauling machine 13 from the idle state to the ready state). As another example, trigger system 12 may adjust the lead time based on operator input via an operator interface. For example, an operator may adjust a knob or provide another type of input that controls the lead time.

Trigger system 12 may determine that the final pass is completed and may transmit, based on determining that the final pass is completed, a movement signal or release in order to cause hauling machine 13 to begin moving (e.g., automatically or based on operator control).

Transition system 14 may receive the movement signal and may cause hauling machine 13 to clear the load location. Here, after hauling machine 13 has cleared the load location, transition system 14 may transmit, and trigger system 12 may receive, a clear signal (e.g., a signal that indicates that hauling machine 13 is clear of the load location). Based on receiving the clear signal associated with hauling machine 13, trigger system 12 may transmit another movement signal in order to cause another hauling machine (e.g., a second hauling machine 13 that is waiting to be loaded by loading machine 11) to begin moving to the load location. In this way, a delay between a time at which a first hauling machine 13 moves and a time at which a second hauling machine 13 is in position can be reduced, thereby further improving productivity of the operation.

When trigger system 12 can determine (e.g., based on information sensed by sensors 53 or based on information provided by transition system 14) a distance of the second hauling machine 13 from the load location, trigger system 12 may cause the second hauling machine 13 truck to move before the first hauling machine 13 is clear of the load location (e.g., in order to minimize down time of loading machine 11 by causing the second hauling machine 13 to be nearer to the load location earlier than it would otherwise).

Trigger system 12 may transmit the trigger signal in order to cause the second hauling machine 13 to initiate a transition from an idle state to a ready state. For example, trigger system 12 may transmit the trigger signal such that the trigger signal is received by a transition system 14 of the second hauling machine 13 (e.g., in addition to being received by transition system 14 of the first hauling machine 13). Here, transition system 14 of the second hauling machine 13 may receive the trigger signal, and may initiate the transition associated with the second hauling machine 13 (e.g., in a manner similar to that described above). In this way, a delay associated with readying the second hauling machine 13 to move to the load location is reduced or eliminated, thereby further improving productivity of the operation.

As indicated above, FIGS. 1-4 are provided as examples. Other examples may differ from what is described in connection with FIGS. 1-4.

Figure 5:
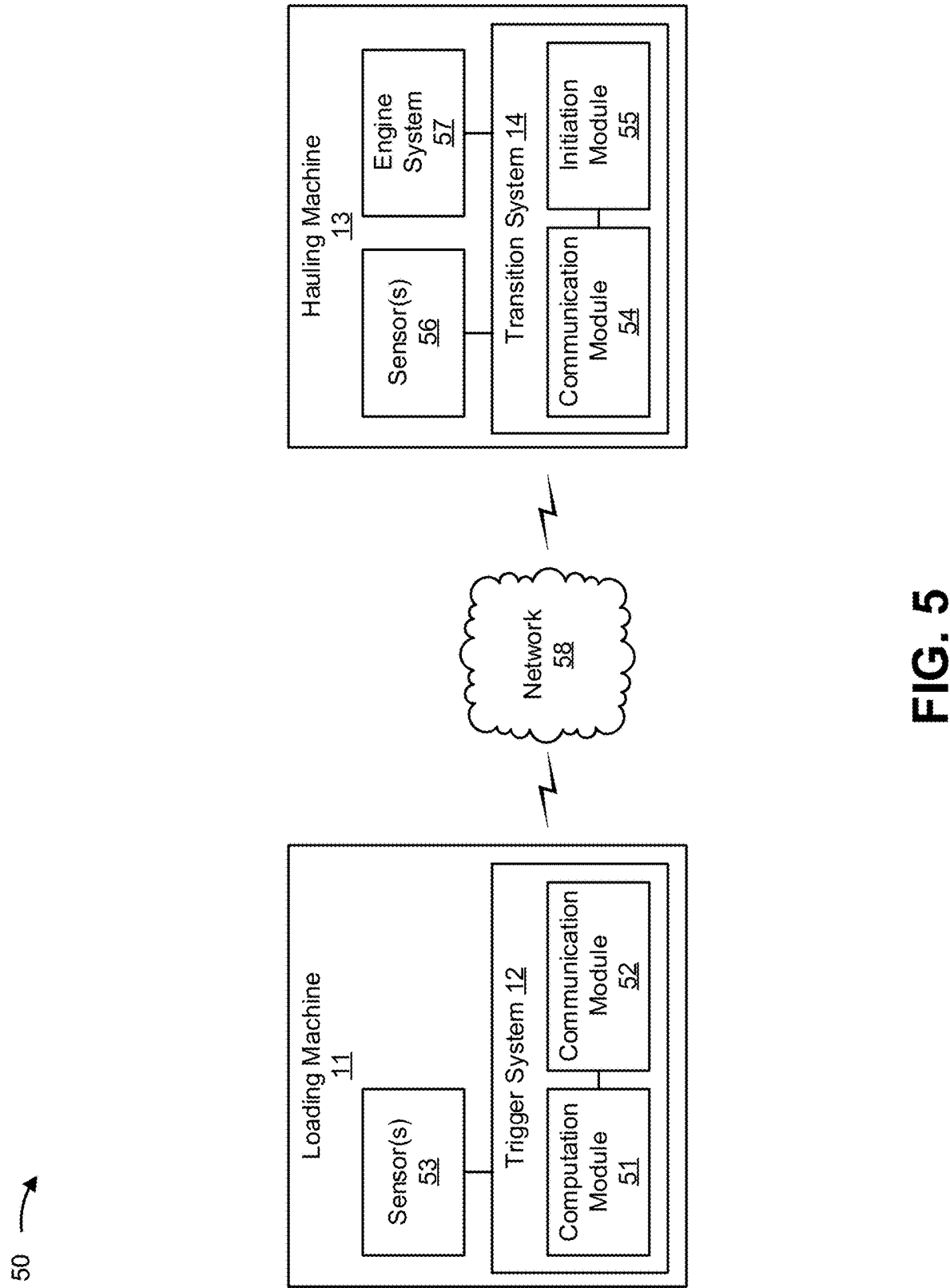
FIG. 5 is a diagram of an example environment in which systems and/or methods described herein may be implemented.

FIG. 5 is a diagram of an example environment 50 in which systems and/or methods described herein may be implemented. As shown in FIG. 5, environment 50 may include loading machine 11, hauling machine 13, and a network 58. As shown, loading machine 11 may be configured with trigger system 12 and one or more sensors 53. As further shown, trigger system 12 of loading machine 11 may include a computation module 51 and a communication module 52. As further shown in FIG. 5, hauling machine 13 may be configured with transition system 14, one or more sensors 56, and an engine system 57. As shown, transition system 14 may include a communication module 54 and an initiation module 55. Devices and/or components of environment 50 may interconnect via wired connections, wireless connections, or a combination of wired and wireless connections.

Sensors 53 include any type of sensor configured to measure, detect, or sense information associated with loading machine 11. For example, sensor 53 may include a weight sensor (e.g., to detect a weight of material in a bucket of loading machine 11), a position sensor (e.g., an angle sensor to detect an angular position of a bucket of loading machine 11, a proximity sensor to detect a position of the bucket relative to hauling machine 13, and/or the like), a speed sensor (e.g., to detect an angular speed of the bucket of loading machine 11, to detect a speed of the bucket of the machine relative to hauling machine 13, and/or the like), a location sensor (e.g., a global positioning system (GPS) receiver, a GPS sensor, and/or the like) and/or another type of sensing device. As indicated in FIG. 5, sensors 53 may be capable of providing information to and/or receiving information from trigger system 12.

Trigger system 12 includes a system to transmit a trigger signal (e.g., trigger signal 15) in association with causing hauling machine 13 to initiate a transition from an idle state to a ready state before a final pass is completed, as described herein. Computation module 51 of trigger system 12 includes one or more devices to compute (e.g., based on information provided by sensors 53, based on information received from transition system 14 via communication module 52, based on information determined by trigger system 12, and/or the like) a trigger time associated with transmitting the trigger signal, as described herein. Communication module 52 of trigger system 12 includes one or more components to transmit information (e.g., a trigger signal, a movement signal, and/or the like) and/or receive information (e.g., a clear signal, current load information, and/or the like).

Sensors 56 include any type of sensor configured to measure, detect, or sense information associated with hauling machine 13. For example, sensor 53 may include a weight sensor (e.g., to detect a weight of material in a bed of hauling machine 13), a position sensor (e.g., to detect a position of a bucket of loading machine 11 relative to hauling machine 13, and/or the like), a location sensor, and/or another type of sensing device. As indicated in FIG. 5, sensors 56 may be capable of providing information to and/or receiving information from transition system 14.

Engine system 57 includes an engine system of hauling machine 13. Engine system 57 may include an engine, a generator, a power conversion device, a retarding grid, one or more drive motors, one or more wheel stations, and/or the like. Engine system 57 includes one or more devices associated with controlling or operating the engine of hauling machine 13. As indicated in FIG. 5, one or more components of engine system 57 may be capable of providing information to and/or receiving information from transition system 14 (e.g., such that one or more devices or components of engine system 57 can operate based on information provided by transition system 14).

Transition system 14 includes a system to receive a trigger signal (e.g., trigger signal 15) and initiate a transition of hauling machine 13 from an idle state to a ready state before a final pass is completed, as described herein. Communication module 54 of transition system 14 includes one or more components to receive information (e.g., a trigger signal, a movement signal, and/or the like the like) and/or transmit information (e.g., a clear signal, current load information, information measured by sensors 56, and/or the like). Initiation module 55 of transition system 14 includes one or more devices to initiate a transition of hauling machine 13 from the idle state to the ready state. For example, as indicated in FIG. 5, initiation module 55 may include one or more devices (e.g., one or more controllers) that cause an engine speed of the engine to increase and (optionally) one or more devices that cause a pre-load to be applied to the engine of hauling machine 13, as described above.

A given component (e.g., one of the devices, systems, or modules described herein, such as trigger system 12, transition system 14, computation module 51, communication module 52, sensors 53, communication module 54, initiation module 55, sensors 56, engine system 57, and/or the like) is implemented as a processor, such as a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, and/or a combination of hardware and software. The given component includes one or more processors capable of being programmed to perform a function. The given component may include a memory, such as a random-access memory (RAM), a read only memory (ROM), and/or another type of dynamic or static storage device (e.g., a flash memory, a magnetic memory, and/or an optical memory) that may store information and/or instructions for use by the given component. The given component may include a memory (e.g., a non-transitory computer-readable medium) capable of storing instructions, that when executed, cause the processor to perform one or more processes and/or methods described herein. The given component executes the instructions to perform various functions as described herein. The given component may include any appropriate type of communication and control system configured to perform functions described herein. Further, the given component may also control another system of a machine, such as an engine system, a transmission system, a hydraulics system, and/or the like.

The given component includes an input component that permits information to be input to the system, such as via user input (e.g., a touch screen display, a keyboard, a keypad, a mouse, a button, a switch, and/or a microphone). Additionally, or alternatively, the input component may include a sensor for sensing information, as described above. The given component may also include an output component that provides output information (e.g., a display, a speaker, and/or one or more light-emitting diodes (LEDs)).

The given component also includes a communication interface that includes a transceiver-like component (e.g., a transceiver and/or a separate receiver and transmitter) that enables communication with other devices, such as via a wired connection, a wireless connection, or a combination of wired and wireless connections. For example, the communication interface may include an Ethernet interface, an optical interface, a coaxial interface, an infrared interface, a radio frequency (RF) interface, a universal serial bus (USB) interface, a Wi-Fi interface, a cellular network interface, or the like.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) of environment 50 may perform one or more functions described as being performed by another set of components of environment 50.

Figure 6:
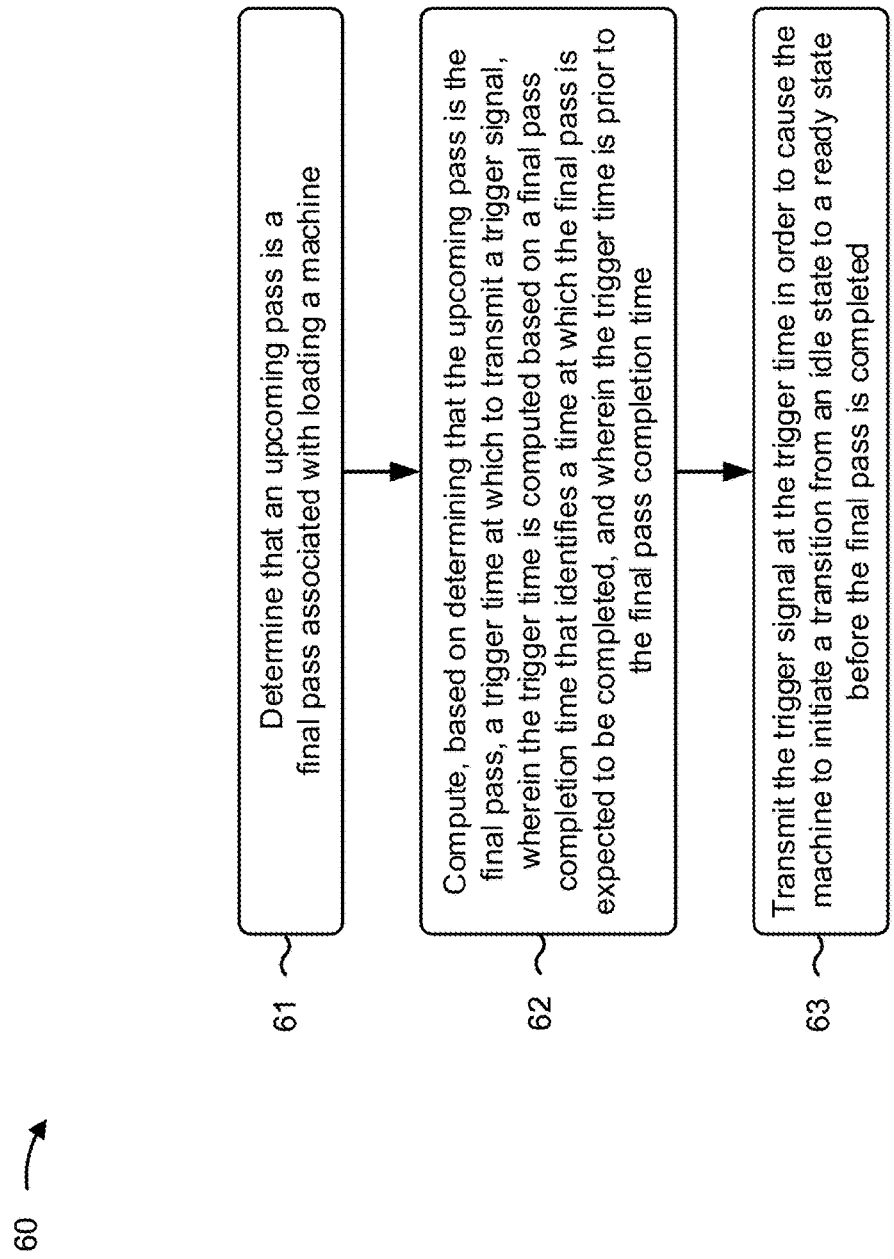
FIG. 6 is a flow chart of an example process for transmitting a trigger signal in order to cause a hauling machine to initiate a transition from an idle state to a ready state before a final pass, associated with loading the hauling machine, is completed.

FIG. 6 is a flow chart of an example process 60 for transmitting a trigger signal in order to cause a machine to initiate a transition from an idle state to a ready state before a final pass, associated with loading the machine, is completed. One or more process blocks of FIG. 6 may be performed by a trigger system of a loading machine (e.g., trigger system 12 of loading machine 11).

As shown in FIG. 6, process 60 may include determining that an upcoming pass is a final pass associated with loading a machine (block 61). For example, the trigger system (e.g., using computation module 51) may determine that an upcoming pass is a final pass associated with loading a machine (e.g., hauling machine 13), as described above.

The system may determine that the upcoming pass is the final pass based on the current load information, where the current load information is received from the machine during the loading of the machine or computed by the system during the loading of the machine.

As shown in FIG. 6, process 60 may include computing, based on determining that the upcoming pass is the final pass, a trigger time at which to transmit a trigger signal (block 62). For example, the trigger system (e.g., using computation module 51) may compute, based on determining that the upcoming pass is the final pass, a trigger time at which to transmit a trigger signal, as described above. The trigger system may compute the trigger time based on a final pass completion time that identifies a time at which the final pass is expected to be completed. The trigger time is prior to the final pass completion time.

The system may determine the time at which the final pass is expected to be completed based on a position of a bucket and a movement speed of the bucket.

Additionally, or alternatively, the system may determine the final pass completion time based on a set of pass completion times (e.g., associated with previous completed passes).

The system may compute the trigger time based on a lead time, where the lead time identifies an amount of time before the final pass completion time that the trigger signal is to be transmitted. After the final pass is completed, the system may adjust the lead time (e.g., based on a time difference between the final pass completion time and a time at which the transition from the idle state to the ready state is completed, based on operator input, and/or the like).

As shown in FIG. 6, process 60 may include transmitting the trigger signal at the trigger time in order to cause the machine to initiate a transition from an idle state to a ready state before the final pass is completed (block 63). For example, the trigger system (e.g., using communication module 52) may transmit the trigger signal at the trigger time in order to cause the machine to initiate a transition from an idle state to a ready state before the final pass is completed, as described above.

The system may transmit the trigger signal in order to cause the machine to increase a speed of an engine of the machine, or to cause the machine to increase the speed of the engine and to cause the machine to apply a pre-load on the engine.

After the final pass is completed, the system may transmit a movement signal in order to cause the machine to begin moving (e.g., automatically or based on operator control).

After transmitting the movement signal, the system may receive a clear signal, associated with the machine, and may transmit another movement signal in order to cause another machine (e.g., another hauling machine 13) to begin moving. The machine may transmit the trigger signal in order to cause the other machine to initiate a transition from an idle state to a ready state.

Although FIG. 6 shows example blocks of process 60, process 60 may include additional blocks, fewer blocks, different blocks, or differently arranged blocks than those depicted in FIG. 6. Additionally, or alternatively, two or more of the blocks of process 60 may be performed in parallel.

FIG. 7 is a flow chart of an example process 70 for initiating, based on receiving a trigger signal, a transition from an idle state to a ready state before a final pass, associated with loading a hauling machine, is completed. One or more process blocks of FIG. 7 may be performed by a transition system of a hauling machine (e.g., transition system 14 of hauling machine 13).

As shown in FIG. 7, process 70 may include determining configuration information associated with a transition of a machine from an idle state to a ready state (block 71). For example, the transition system (e.g., using initiation module 55 and/or communication module 54) may determine configuration information associated with a transition of a machine (e.g., hauling machine 13) from an idle state to a ready state, as described above.

The configuration information may indicate that, when initiating the transition from the idle state to the ready state, a speed of an engine of the machine is to be increased. Additionally, or alternatively, the configuration information may indicate that, when initiating the transition from the idle state to the ready state, the speed of the engine of the machine is to be increased and that a pre-load is to be applied to the engine.

As shown in FIG. 7, process 70 may include receiving a trigger signal associated with initiating the transition of the machine from the idle state to the ready state (block 72). For example, the transition system (e.g., using communication module 54) may receiving a trigger signal associated with initiating the transition of the machine from the idle state to the ready state, as described above.

The system may provide current load information associated with the machine. Here, the trigger signal may be received after the current load information is provided.

As shown in FIG. 7, process 70 may include initiating, based on receiving the trigger signal and in accordance with the configuration information, the transition of the machine from the idle state to the ready state (block 73). For example, the transition system (e.g., using initiation module 55) may initiate, based on receiving the trigger signal and in accordance with the configuration information, the transition of the machine from the idle state to the ready state, as described above. The machine may initiate the transition from the idle state to the ready state prior to a time at which a final pass, associated with loading the machine, is completed.

The system may cause engine power that results from a pre-load being applied to the engine before the final pass is completed to be rejected over a retarding grid of the machine.

The system may cause the machine to begin moving based on receiving a movement signal. The system may, after beginning moving, transmit a clear signal in order to cause another machine (e.g., another hauling machine 13) to begin moving.

Although FIG. 7 shows example blocks of process 70, process 70 may include additional blocks, fewer blocks, different blocks, or differently arranged blocks than those depicted in FIG. 7. Additionally, or alternatively, two or more of the blocks of process 70 may be performed in parallel.

INDUSTRIAL APPLICABILITY

The disclosed systems (e.g., trigger system 12 and transition system 14) may be used with any operation where productivity is dependent on readiness and ability of a hauling machine (e.g., hauling machine 13) to clear or move into a load location. The disclosed systems cause a trigger signal (e.g., trigger signal 15) to be sent (e.g., by trigger system 12 of loading machine 11) at a trigger time that is prior to a final pass, associated with loading the hauling machine, to be completed. Here, the trigger signal is received (e.g., by transition system 14 of hauling machine 13) and causes the hauling machine to initiate a transition from an idle state to a ready state before the final pass is completed. As such, when the final pass is completed, a delay between the time at which the hauling machine is fully loaded and a time at which the hauling machine has full engine power to the ground and/or is capable of moving (e.g., a time at which the machine has sufficient power at wheels to initiate movement) is reduced or eliminated, thereby allowing the hauling machine to clear the load location in a timely manner and, thus, increasing productivity of the operation.

Additionally, the disclosed systems allow a delay, between a time at which the hauling machine clears a load location and a time at which another hauling machine (e.g., another hauling machine 13) is in position in the load location, to be reduced, which further optimizes efficiency and productivity of the systems and operation. Further, the disclosed systems allow (e.g., by receiving the trigger signal at the other hauling machine) a delay associated with readying the other hauling machine to move to the load location to be reduced or eliminated, thereby further optimizing efficiency and productivity of the operation.

What is claimed is:

1. A system, comprising:
one or more devices to:
determine that an upcoming pass is a final pass associated with loading a machine, wherein the final pass is one of multiple passes that occur while the machine is positioned at a load location;
compute, based on determining that the upcoming pass is the final pass, a trigger time at which to transmit a trigger signal,
wherein the trigger time is computed based on a final pass completion time that identifies a time at which the final pass is expected to be completed, and
wherein the trigger time is prior to the final pass completion time; and
transmit the trigger signal at the trigger time in order to cause the machine to initiate a transition from an idle state to a ready state before the final pass is completed.

2. The system of claim 1, wherein the one or more devices are further to:
determine current load information associated with the machine; and
wherein the one or more devices, when determining that the upcoming pass is the final pass, are to:
determine that the upcoming pass is the final pass based on the current load information.

3. The system of claim 2, wherein the current load information is received from the machine during the loading of the machine or computed by the system during the loading of the machine.

4. The system of claim 1, wherein the one or more devices are further to:
determine a position of a bucket that is to perform the final pass associated with the loading the machine;
determine a movement speed of the bucket that is to perform the final pass associated with the loading the machine; and
determine the time at which the final pass is expected to be completed based on the position of the bucket and the movement speed of the bucket.

5. The system of claim 1, wherein the one or more devices are further to:
determine a set of pass completion times, each identifying a time at which a respective previous pass, associated with the loading the machine, was completed; and
determine the time at which the final pass is expected to be completed based on the set of pass completion times.

6. The system of claim 1, wherein the one or more devices are further to:
identify a lead time, associated with transmitting the trigger signal, that identifies an amount of time before the final pass completion time that the trigger signal is to be transmitted; and
wherein the one or more devices, when computing the trigger time, are to:
compute the trigger time further based on the lead time.

7. The system of claim 6, wherein the one or more devices are further to:
identify a time difference between the final pass completion time and a time at which the transition from the idle state to the ready state is completed; and
adjust the lead time based on the time difference.

8. The system of claim 1, wherein the one or more devices, when transmitting the trigger signal in order to cause the machine to initiate the transition from the idle state to the ready state, are to one of:
transmit the trigger signal in order to cause the machine to increase a speed of an engine of the machine; or
transmit the trigger signal in order to cause the machine to increase the speed of the engine and to cause the machine to apply a pre-load on the engine.

9. The system of claim 1, wherein the one or more devices are further to:
determine that the final pass is completed; and
transmit, based on determining that the final pass is completed, a movement signal in order to cause the machine to begin moving,
wherein the movement signal is transmitted after the trigger signal is transmitted.

10. The system of claim 9, wherein the machine is a first machine and the movement signal is a first movement signal, and wherein the one or more devices, are further to:
receive, after transmitting the first movement signal, a clear signal associated with the first machine; and
transmit, based on receiving the clear signal, a second movement signal in order to cause a second machine to begin moving,
wherein the second machine is to be loaded after the final pass, associated with the loading of the first machine, is completed.

11. The system of claim 1, wherein the machine is a first machine, and wherein the one or more devices, when transmitting the trigger signal, are further to:
transmit the trigger signal in order to cause a second machine to initiate a transition from an idle state to a ready state,
wherein the second machine is to be loaded after the final pass, associated with the loading the first machine, is completed.

12. A system, comprising:
one or more devices to:
determine configuration information associated with a transition of a machine from an idle state to a ready state;
receive a trigger signal associated with initiating the transition of the machine from the idle state to the ready state; and
initiate, based on receiving the trigger signal and in accordance with the configuration information, the transition of the machine from the idle state to the ready state,
wherein the transition from the idle state to the ready state is initiated prior to a time at which a final pass, associated with loading the machine, is completed,
wherein the final pass is one of multiple passes that occur while the machine is positioned at a load location,
wherein the configuration information indicates that, when initiating the transition from the idle state to the ready state, that a pre-load is to be applied to an engine of the machine, and
wherein engine power that results from the pre-load being applied to the engine before the final pass is completed is caused to be rejected over a retarding grid of the machine.

13. The system of claim 12, wherein the one or more devices are further to:
provide current load information associated with the machine,
wherein the trigger signal is received after the current load information is provided.

14. The system of claim 12, wherein the configuration information further indicates that, when initiating the transition from the idle state to the ready state, a speed of the engine is to be increased.

15. The system of claim 12, wherein the one or more devices are further to:
receive a movement signal associated with causing the machine to begin moving,
wherein the movement signal is received after the trigger signal is received; and
cause the machine to begin moving based on receiving the movement signal.

16. The system of claim 15, wherein the machine is a first machine, and wherein the one or more devices, are further to:
transmit, after beginning moving, a clear signal in order to cause a second machine to begin moving,
wherein the second machine is to be loaded after the final pass, associated with the loading the first machine, is completed.

17. A method, comprising:
determining, by a system, that an upcoming pass is a final pass associated with loading a machine, wherein the final pass is one of multiple passes that occur while the machine is positioned at a load location;
computing, by the system and based on determining that the upcoming pass is the final pass, a trigger time associated with causing a trigger signal to be transmitted,
wherein the trigger time is computed based on a final pass completion time that identifies a time at which the final pass is expected to be completed, and
wherein the trigger time is prior to the final pass completion time;
causing, by the system, the trigger signal to be transmitted at the trigger time; and
causing, by the system and based on a receipt of the trigger signal, a transition of the machine from an idle state to a ready state to be initiated,
wherein the transition from the idle state to the ready state is caused to be initiated prior to a time at which the final pass, associated with loading the machine, is completed.

18. The method of claim 17, wherein initiating the transition from the idle state to the ready state comprises:
causing the machine to increase a speed of an engine of the machine; or
causing the machine to increase the speed of the engine and causing the machine to apply a pre-load on the engine.

19. The method of claim 17, further comprising:
determining current load information associated with the machine,
wherein determining that the upcoming pass is the final pass comprises:
determining that the upcoming pass is the final pass based on the current load information.

20. The method of claim 17, further comprising:
determining a position of a bucket that is to perform the final pass associated with the loading the machine;
determining a movement speed of the bucket that is to perform the final pass associated with the loading the machine; and
determining the time at which the final pass is expected to be completed based on the position of the bucket and the movement speed of the bucket.

* * * * *